United States Patent
Jensen et al.

(10) Patent No.: US 7,000,010 B1
(45) Date of Patent: *Feb. 14, 2006

(54) SYSTEM AND METHOD FOR CACHING WEB PAGES ON A MANAGEMENT APPLIANCE FOR PERSONAL COMPUTERS

(75) Inventors: Christopher M. Jensen, Iowa City, IA (US); David T. Medin, Marion, IA (US); Matthew J. Poduska, Center Point, IA (US)

(73) Assignee: Crystal Group Inc., Hiawatha, IA (US)

( * ) Notice: Subject to any disclaimer, the term of this patent is extended or adjusted under 35 U.S.C. 154(b) by 608 days.

This patent is subject to a terminal disclaimer.

(21) Appl. No.: 10/064,937

(22) Filed: Aug. 30, 2002

Related U.S. Application Data

(63) Continuation-in-part of application No. 09/681,078, filed on Dec. 22, 2000, now Pat. No. 6,738,930.

(51) Int. Cl.
*G06F 11/30* (2006.01)
(52) U.S. Cl. .......................... 709/219; 714/30
(58) Field of Classification Search ................ 709/219, 709/223, 224; 714/11, 30, 47–48, 57
See application file for complete search history.

(56) References Cited

U.S. PATENT DOCUMENTS

| | | | |
|---|---|---|---|
| 5,944,839 A * | 8/1999 | Isenberg | 714/26 |
| 5,987,611 A * | 11/1999 | Freund | 713/201 |
| 6,629,267 B1 * | 9/2003 | Glerum et al. | 714/38 |
| 6,714,977 B1 * | 3/2004 | Fowler et al. | 709/224 |
| 6,738,930 B1 * | 5/2004 | Medin et al. | 714/30 |
| 6,859,831 B1 * | 2/2005 | Gelvin et al. | 709/224 |
| 6,874,691 B1 * | 4/2005 | Hildebrand et al. | 236/51 |
| 2003/0217100 A1 * | 11/2003 | Kronk | 709/203 |

* cited by examiner

*Primary Examiner*—Zarni Maung
*Assistant Examiner*—Van Nguyen
(74) *Attorney, Agent, or Firm*—Simmons, Perrine, Albright & Ellwood, P.L.C.

(57) ABSTRACT

A system and method for monitoring and managing an industrial computer which generates a web page, the system comprising an internal web page cache which stores numerous recent versions of said web page and makes them available via an independent management appliance CPU and an out-of-band connection to the internet.

20 Claims, 2 Drawing Sheets

SYSTEM AND METHOD FOR CACHING WEB PAGES ON A MANAGEMENT APPLIANCE FOR PERSONAL COMPUTERS

CROSS REFERENCE TO RELATED APPLICATIONS

This application is a continuation-in-part application of an application entitled "Method and System for Extending the Functionality of an Environmental Monitor for an Industrial Personal Computer" by David T. Medin, Matthew J. Poduska and Christopher M. Jensen, application Ser. No. 09/681,078 and filed on Dec. 22, 2000, now U.S. Pat. No. 6,738,930 which application is incorporated herein in its entirety by this reference.

BACKGROUND OF INVENTION

In recent years, industrial personal computers have become increasingly prevalent in many industries. It is not uncommon today to see installations with rows of industrial PCs arranged in racks. While many of these industrial PCs are often designed and manufactured to higher standards than consumer PCs, they still are occasionally in need of repair, and downtime can be expensive and problematic for many industrial PC users. Consequently, users of industrial PCs will often desire to monitor the interior and exterior environments of such PCs, as well as the operations of the applications they run. Monitoring the PCs can help to predict, postpone, understand, troubleshoot and eliminate some application software problems, as well as industrial PC failures. Remote environmental monitoring, via an "out-of-band" environmental monitor disposed in the industrial PC, can be most beneficial with geographically dispersed computer networks. Such remote monitoring has been successfully performed with prior art monitors. Additionally, some of these "out-of-band" environmental monitors have even been enhanced to permit shutting down the Windows NT operating system on the remotely located industrial PC.

While these function-enhanced management appliances have been used extensively in the past, they do have some drawbacks. First of all, their functionality has been primarily limited to monitoring of preset environmental conditions. Typically, these preset environmental conditions are established at the time the industrial PC or the management appliance, or both, are initially configured for operation. However, over time, the desires of an industrial PC administrator may change due to changes in the way the PCs are utilized. When this occurs, it is then necessary to change the preset configurations. Often, it is difficult to change the parameters being monitored. Typically, the host PC would need to be opened, and the management appliance would need to be removed and replaced, or at least reconfigured. It has often been extremely difficult, if not impossible, to reconfigure the monitored parameters of an industrial PC from a remote administration facility. Secondly, when the main microprocessor for the industrial PC failed, crashed, or otherwise hung up, it was then nearly impossible to determine information about the reason for the crash if such information was dependent, in some way, upon that main microprocessor for reporting, etc.

Consequently, there exists a need for improved methods and systems for monitoring an industrial PC.

SUMMARY OF INVENTION

It is an object of the present invention to provide a system and method for monitoring web pages output by an industrial personal computer.

It is a feature of the present invention to utilize a microserver, disposed in the management appliance for retrieving web pages from the host industrial PC.

It is another feature of the present invention to include both a direct connection between the management appliance and the host CPU, via a well-known data link scheme and a connection via the internet.

It is another feature of the present invention to include on the host computer a worldwide web server which provides information about an application running on the host computer.

It is an advantage of the present invention to achieve improved efficiency in monitoring conditions in and operational statuses of application software running on industrial personal computers.

It is another advantage of the present invention to provide a management appliance with enhanced capabilities.

The present invention is a management appliance and method for monitoring and managing an industrial personal computer designed to satisfy the aforementioned needs, provide the previously stated objects, include the above-listed features, and achieve the already articulated advantages. The present invention is carried out in a "technician-less" manner in a sense that the time consumed by a technician with opening the case for enhancing or changing the functionality of a monitor of an industrial PC, has been greatly reduced, if not eliminated, in certain circumstances.

Accordingly, the present invention is a system and method including a microserver disposed on a management appliance, disposed in a host computer, the microserver for accessing and caching web pages from the host computer.

BRIEF DESCRIPTION OF DRAWINGS

The invention may be more fully understood by reading the following description of the preferred embodiments of the invention, in conjunction with the appended drawings wherein.

DETAILED DESCRIPTION

Figure 1:
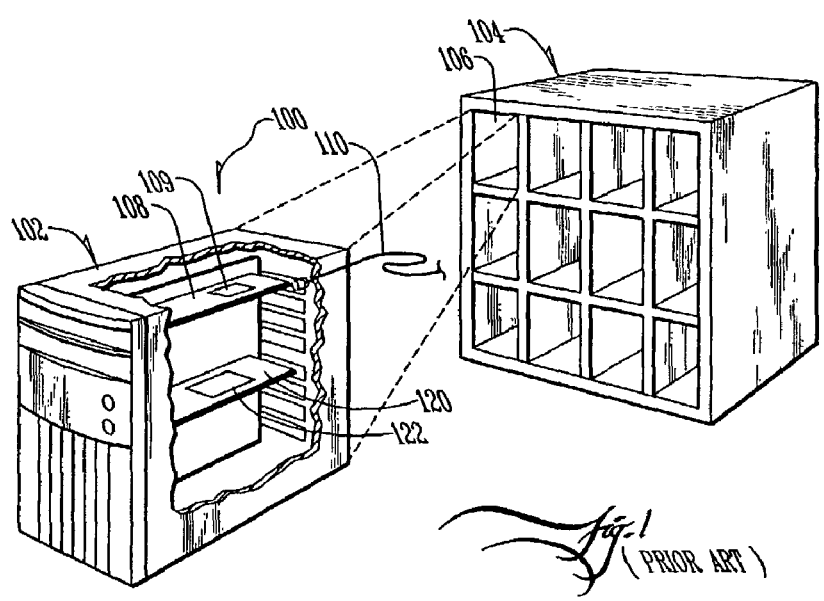
FIG. 1 is a simplified view of a system of the prior art.

Now referring to the drawings wherein like numerals refer to like matter throughout, and more specifically referring to FIG. 1, there is shown a system of the prior art, generally designated 100, including an industrial PC 102, for insertion into a rack 104, having an empty slot 106 therein. The PC 102 has a motherboard card 120 with a host CPU 122 thereon. Also in PC 102 is a management appliance 108 having a management appliance CPU 109 thereon with an "out-of-band" external communication port 110 for communicating with an external network. Industrial PC 102 will, with the use of the host CPU 122 and a www server within PC 102, generate web pages. In the past, management appliances have been limited because they required that changes be made to custom software to change the parameters or the ways a management appliance monitors events on a host computer.

Figure 2:
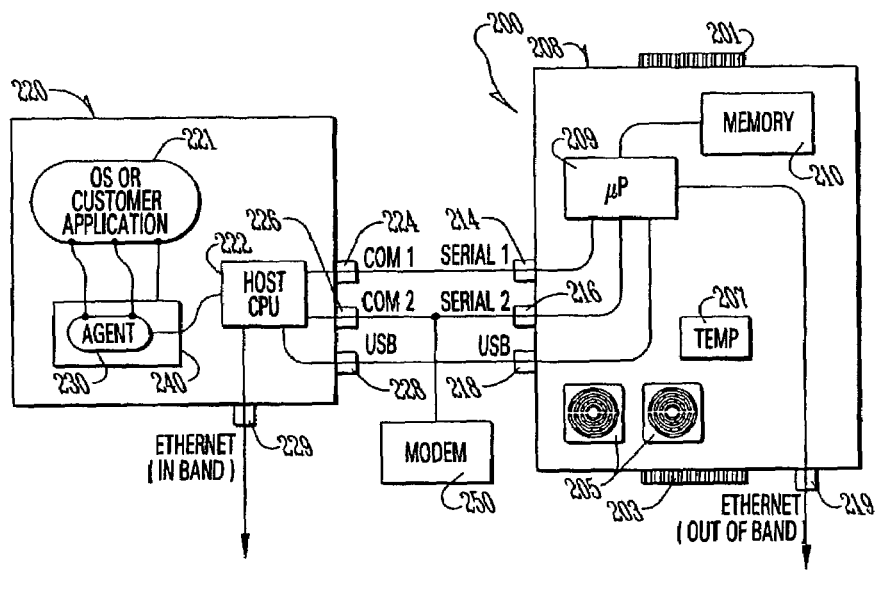
FIG. 2 is a simplified view of a system of the present invention.

A detailed understanding of the present invention can be achieved by now referring to FIG. 2, which shows a combination of circuit cards, of a portion of an industrial personal computer generally designated 200, including a host CPU card 220, which can be either a motherboard or a CPU card (for use with a passive backplane) and a management appliance 208, which includes a management appliance microprocessor 209, a management appliance #1 serial port 214, a management appliance #2 serial port 216, and USB port 218. In a preferred embodiment, management appliance 208 has ISA bus connections 201 and PCI bus connections 203 on opposing sides of the card 208 so it may be deployed in a PC with either type of expansion bus by merely flipping the card 208 over. The host CPU card 220 provides the primary processing capabilities for industrial personal computer 200, and the management appliance 208 provides several functions, including typical management appliance functions of monitoring and reporting environmental conditions in PC 200, such as temperatures 207, fans 205, power levels, etc. Similar to prior art management appliances, management appliance 208 also includes a capability of "out-of-band" reporting and communication via management appliance Ethernet port 219. Ethernet is a preferred port, but any communication scheme capable of digital communication could be used as well. Management appliance Ethernet port 219 may be coupled to the internet or a proprietary network, depending upon user's preferences. A remote administrator (not shown) can access the management appliance 208 via management appliance Ethernet port 219.

One of the key novel aspects of the present invention is that a microserver, of the type which is well known in the art and is capable of handling "IP-based-content", resides in memory 210 on management appliance 208 and is accessible via management appliance Ethernet port 219. The term "IP-based-content" is intended to include, but not be limited to, content in the following formats: SNMP, HTTP, Telnet, etc. Now, any information on the PC 200 which is accessible by management appliance microprocessor 209 is accessible through the microserver and the Ethernet port 219. A software agent 230 is disposed in memory 240 on host CPU card 220. The purpose of agent 230 is as follows: Agent 230 gathers information from the management appliance 208 for its own use and for reporting via an in-band connection through Ethernet port 229. Agent 230 also performs the function of extracting information desired to be monitored from the OS or customer application 221 and rendering it in an industry standard format, so that it appears that the management appliance were measuring the information directly. The Agent also extracts information from the management appliance and makes it available to the OS or applications running on the host CPU. The agent could be as simple as the customer application generating an HTML file that it keeps updated with the values desired to be observed. OS and customer application 221 are shown as a single object on the host CPU card 220. This is done to highlight that there are connections between these and the agent 230. It should be understood that they need not be located on the host CPU card, nor need they be combined in a single object.

Management appliance 208 and host CPU card 220 are coupled together in several ways. For example, the COM 1 port 224 of host CPU card 220 is coupled to the SERIAL 1 port 214 on management appliance 208. Similarly, COM 2 port 226 is coupled to SERIAL 2 port 216 and USB port 228 is coupled to USB port 218. Also, while it is not the preferred path of communication between management appliance 208 and host CPU card 220, the two Ethernet ports 219 and 229 could be interconnected through an internet or other network connection. SERIAL 2 port 216 and COM 2 port 226 may be coupled to a modem 250 and then via an external telephone network (not shown) to a remote administrator.

In operation, the apparatus and method of the present invention could function as follows: a management appliance 208 disposed inside of PC 200 monitors various environmental conditions therein. This information is then provided to the PC 200 via the COM 1 port 224 and Serial 1 port 214 connection and to remote users via Ethernet port 219. Due to the microservers on host CPU card 220 and management appliance 208, much additional information can also be communicated.

Management appliance 208 can also maintain a web page cache, where it stores in memory 210 web pages available from host CPU card 220, via agent 230. This web page is preferably a web page that is either a part of the customer application 221 or a separate page designed to monitor the function of a customer application 221.

For example, host PC 200 may be used for an automated call center for processing calls from customers of a business. The business could have numerous PCs using identical application software to assist in the call center. The application software 221 could have a software glitch which causes the system to crash after it has answered its $200^{th}$ call. The host computer 200, with the aid of agent 230, generates a web page during normal operation of the application program 221 and PC 200, so that the web page reflects a current status of the application program 221. For example, it may include a running tally of the calls processed by the application program 221 since it was last reset. If the agent 230 generates a web page which is updated continuously or at frequent periodic intervals, then this status web page could be helpful in understanding the operation of the application program 221. The management appliance would be programmed to periodically, at frequent intervals, cache this status web page generated by the agent 230. In the event of a crash of the OS of the PC 200, management appliance 208, with its cache of the status web page, would indicate that the OS crashed at the $200^{th}$ caller. If this occurred repeatedly on various PCs in the call center, this information (cached status web page) could be helpful in correcting the software error in an expeditious manner.

Also, with the help of a dial-up connection through the COM 2-Serial 2 connections, for example, and the information available through the out-of-band Ethernet connection, the host CPU 222 might be rebooted. If the PC 200 is not completely crashed, it may be possible and desirable to remotely shut it down, in a more "delicate" way than a hard restart with all of its consequences. The agent 230 may be operating system independent communication interfaces, such as the PPP protocol.

Another very important operational feature of the present invention is the ability of the management appliance to be extended or changed while in service in the field. Often the needs of an industrial PC user can change over time. If the management appliance can be extensible remotely, without the need for an outside technician, then numerous quite beneficial changes, fixes, upgrades, etc., which might not be economically justified if an on-site service call were required, become available. One approach to carrying out this in-the-field service is to use codes on the PC 200, such as the agent 230 or microservers, etc., stored in the memory 240, which can be readily edited on the PC 200, either remotely through the in-band network connection or locally. If the web pages on the Host CPU card 220 or elsewhere in PC 200 which are available for monitoring by the management appliance 208 are changed, by relatively easy code changes to the code (agent 230 or microservers stored on memory 240) running on the host CPU 222, then the capabilities of the management appliance can thusly be very easily changed. The prior art methods of having to remove the management appliance or create proprietary application extensions to make a change become much less attractive than the innovative methods for effecting changes which are enabled by the present invention. Now end users can readily remotely customize the operation of their environmental monitors. This is not a trivial advantage.

Throughout this description, reference is made to an industrial PC and to an Ethernet, because it is believed that the beneficial aspects of the present invention would be most readily apparent when used in connection with industrial PCs and Ethernet connections; however, it should be understood that the present invention is not intended to be limited to industrial PCs and Ethernet connections and should be hereby construed to include other non-industrial PCs and non-Ethernet applications as well.

Throughout this description, references have been made to monitoring environmental conditions in a Host computer. It should be understood that the present invention is also applicable to monitoring conditions or parameters within the host PC which relate to the OS and customer applications 221. In fact, these OS and customer application conditions or parameters could be monitored instead of the environmental conditions.

Throughout this description, the terms "industrial personal computer", "industrial PC" or "industrial computer" are used to represent a PC of the type which is capable of being stored in racks of multiple rows of PCs, where each row has multiple PCs and where the PCs are coupled to wiring associated with the rack 104 and other equipment by at least one blind mateable connector at the rear end of the PC 102. This definition of "industrial personal computer", "industrial PC" or "industrial computer" is not intended to include laptop PCs which have a blind mating connector on the rear end of the laptop for coupling with a docking station or a port replicator. Consequently, the terms "industrial personal computer", "industrial PC" or "industrial computer" will specifically exclude any computer where the width dimension is greater than three times the height dimension and which has along its top side a hinged display screen which is hinged along the rear end of the PC.

It is thought that the method and apparatus of the present invention will be understood from the foregoing description and that it will be apparent that various changes may be made in the form, construct steps, and arrangement of the parts and steps thereof, without departing from the spirit and scope of the invention or sacrificing all of their material advantages. The form herein described is merely a preferred exemplary embodiment thereof.

What is claimed is:

1. An apparatus for managing characteristics of a computer, of the type having a host CPU therein, the apparatus comprising:
   a management appliance, disposed in said computer and, at least indirectly, coupled to said host CPU;
   the management appliance having a management appliance microprocessor therein which runs a management appliance microserver, capable of handling web- and IP-based content;
   the management appliance having an out-of-band connection to a network;
   the management appliance also having an internal connection to the host CPU;
   the host CPU, in combination with a web server in said computer, is configured to generate host computer monitoring web pages;
   via a host CPU to management appliance connection, the management appliance microserver monitors the host computer monitoring web pages; and,
   via the out-of-band connection, the management appliance reports, to an external network, status information contained in said host computer monitoring web pages.

2. An apparatus of claim 1 wherein said computer is an industrial computer and said status information relates to a status of an application program running on said industrial computer via said host CPU.

3. An apparatus of claim 2 wherein said host CPU to management appliance connection comprises an in-band network connection between the host CPU and an external network.

4. An apparatus of claim 1 wherein said management appliance includes a management appliance memory having therein a host computer monitoring web page cache for storing host computer monitoring web pages obtained from said host CPU.

5. An apparatus of claim 4 wherein said host computer monitoring web pages are available to an external network, via the out-of-band connection, despite any crash that may have occurred on host CPU.

6. A method of monitoring a remote computer comprising the steps of:
   providing a remote computer, having a host CPU;
   providing an administrator computer;
   providing a first network connection between said remote computer and said administrator computer; and,
   providing, on said remote computer, a management appliance with a microserver thereon for monitoring host computer monitoring web pages generated via said host CPU.

7. A method of claim 6 wherein said host computer monitoring web pages are application web pages being provided to users external to said remote industrial computer and said administrator computer.

8. A method of claim 7 further comprising the step of:
   saving in a memory cache on said management appliance said host computer monitoring web pages.

9. A method of claim 8 further comprising the step of:
   reporting information previously stored regarding said host computer monitoring web pages to said administrator computer via the second network connection during a time when said first network connection is inoperable due to a failure of said host CPU.

10. A method of claim 9 further comprising the steps of:
    analyzing said information regarding said host computer monitoring web pages and making a determination relating to said failure of said host CPU; and,
    restarting said host CPU via said second network connection.

11. A method of claim 10 wherein said remote computer is an industrial computer and further comprising the steps of making changes to software on said remote industrial computer, after restarting said host CPU, wherein said changes are effected by said determination.

12. An apparatus for extending operational characteristics of a monitor for an industrial PC comprising:
    an industrial PC;
    a second PC;
    first network means for exchanging information between said industrial PC and said second PC;

second network means for exchanging information between said industrial PC and said second PC, so that said second network means is operable despite an operational failure of said first network means;

means for hosting a web page on said industrial PC; and, means, internal to said industrial PC, for caching said web page and providing related information on said second network means.

13. An apparatus of claim 1 wherein said management appliance has both ISA bus connections and PCI bus connections thereon and further such that the ISA bus connections are on an opposite side of said management appliance from said PCI bus connections.

14. An apparatus of claim 5 wherein said management appliance has both ISA bus connections and PCI bus connections thereon and further such that the ISA bus connections are on an opposite side of said management appliance from said PCI bus connections.

15. An apparatus of claim 6 wherein said management appliance has both ISA bus connections and PCI bus connections thereon and further such that the ISA bus connections are on an opposite side of said management appliance from said PCI bus connections.

16. An apparatus of claim 11 wherein said management appliance has both ISA bus connections and PCI bus connections thereon and further such that the ISA bus connections are on an opposite side of said management appliance from said PCI bus connections.

17. An apparatus of claim 12 wherein said means, internal to said industrial PC, for monitoring is a management appliance; and wherein said management appliance has both ISA bus connections and PCI bus connections thereon and further such that the ISA bus connections are on an opposite side of said management appliance from said PCI bus connections.

18. An industrial computer comprising:

a host CPU disposed in said industrial computer; said host CPU coupled to an external computer network via an in-band connection with respect to said host CPU;

a web page server, coupled to and executed via said host CPU;

call center application software executed by said host CPU;

a host computer monitoring web page generated by said web page server, said host computer monitoring web page comprising status information relating to operation of said call center application software;

a management appliance, disposed within said industrial computer and disposed on an expansion card configured to cooperate with an industry standard expansion bus disposed in said industrial computer;

said management appliance comprising a memory and a management appliance CPU, said memory containing numerous variations of said host computer monitoring web page;

said management appliance coupled to said external computer network via an out-of-band connection with respect to said host CPU; and said management appliance configured to provide, via said out-of-band connection and over said external computer network, said numerous variations of said host computer monitoring web page irrespective of a current inoperable status of said host CPU.

19. An industrial computer of claim 18 wherein said management appliance receives said numerous variations of said host computer monitoring web page via an external connection comprising said out-of-band connection, said external computer network and said in-band connection.

20. An industrial computer of claim 18 wherein said management appliance receives said numerous variations of said host computer monitoring web page via an internal connection which is entirely internal to said industrial computer.

* * * * *